(12) United States Patent
Zou et al.

(10) Patent No.: US 7,740,375 B2
(45) Date of Patent: Jun. 22, 2010

(54) HIGH BRIGHTNESS ILLUMINATION DEVICE WITH INCOHERENT SOLID STATE LIGHT SOURCE

(75) Inventors: Hans Zou, Windsor, NJ (US); Duncan J. Anderson, Sleepy Hollow, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 206 days.

(21) Appl. No.: 10/598,898

(22) PCT Filed: Mar. 14, 2005

(86) PCT No.: PCT/IB2005/050897

§ 371 (c)(1), (2), (4) Date: Sep. 14, 2006

(87) PCT Pub. No.: WO2005/091035

PCT Pub. Date: Sep. 29, 2005

(65) Prior Publication Data

US 2008/0247169 A1    Oct. 9, 2008

Related U.S. Application Data

(60) Provisional application No. 60/553,749, filed on Mar. 16, 2004.

(51) Int. Cl.
*F21V 7/22* (2006.01)

(52) U.S. Cl. ............... 362/247; 362/612; 362/628; 362/244; 362/311.06; 362/329; 362/606; 362/610; 362/555; 362/560; 362/800

(58) Field of Classification Search ............ 362/247, 362/612, 628, 235, 244, 311, 329, 606, 607, 362/610, 555, 560, 613, 617, 619, 620, 623, 362/327, 330, 339
See application file for complete search history.

(56) References Cited

U.S. PATENT DOCUMENTS

| 3,877,052 | A |   | 4/1975  | Dixon et al.              |
|-----------|---|---|---------|---------------------------|
| 4,146,883 | A |   | 3/1979  | Appeldorn et al.          |
| 5,710,441 | A |   | 1/1998  | Ackley et al.             |
| 5,856,855 | A | * | 1/1999  | Mol et al. ......... 349/65 |
| 6,011,602 | A | * | 1/2000  | Miyashita et al. ... 349/65 |
| 6,045,238 | A | * | 4/2000  | Wheeler et al. ..... 362/247 |
| 6,092,904 | A | * | 7/2000  | Tai et al. ........... 362/603 |
| 6,144,536 | A |   | 11/2000 | Zimmerman et al.          |
| 6,164,789 | A |   | 12/2000 | Unger et al.              |

(Continued)

FOREIGN PATENT DOCUMENTS

EP    1363460 A2    11/2003

(Continued)

*Primary Examiner*—Sandra L O'Shea
*Assistant Examiner*—Leah S Lovell

(57) ABSTRACT

An illumination light source includes an incoherent solid state light source adapted to emit light over at least one light emission surface and having a total light emission surface area $S_0$; a light circulation device including at least one light receiving surface adapted to receive the light from the incoherent solid state light source, and a light extraction area having a first surface area $S_1$; and a light extraction device for extracting the light from the light circulation device at the light extraction area, wherein $S_1 < S_0$. Accordingly, the apparent brightness of the light is increased by distributing it over a smaller area.

27 Claims, 2 Drawing Sheets

U.S. PATENT DOCUMENTS

| | | | |
|---|---|---|---|
| 6,290,382 B1 | 9/2001 | Bourn et al. | |
| 6,488,389 B2 * | 12/2002 | Cassarly et al. | 362/231 |
| 6,590,625 B1 * | 7/2003 | Umemoto et al. | 349/65 |
| 6,869,206 B2 * | 3/2005 | Zimmerman et al. | 362/310 |
| 6,960,872 B2 * | 11/2005 | Beeson et al. | 313/113 |
| 7,018,087 B2 * | 3/2006 | Yoo | 362/615 |
| 7,048,385 B2 | 5/2006 | Beeson et al. | 353/97 |
| 7,160,017 B2 * | 1/2007 | Lee et al. | 362/620 |
| 2002/0017844 A1 | 2/2002 | Parkyn et al. | |
| 2002/0080615 A1 | 6/2002 | Marshall et al. | |
| 2003/0058386 A1 * | 3/2003 | Bastiaansen et al. | 349/100 |
| 2003/0133079 A1 | 7/2003 | Cobb | |
| 2003/0214615 A1 * | 11/2003 | Colgan et al. | 349/65 |
| 2004/0032728 A1 | 2/2004 | Galli | |
| 2004/0233655 A1 | 11/2004 | Zimmerman et al. | |

FOREIGN PATENT DOCUMENTS

| | | | |
|---|---|---|---|
| EP | 1372008 A | 12/2003 | |
| EP | 1372008 A1 | 12/2003 | |
| EP | 1416545 A | 5/2004 | |
| EP | 1416545 A2 | 5/2004 | |
| EP | 1496380 A | 1/2005 | |
| EP | 1496380 A1 | 1/2005 | |
| JP | 58131781 A | 8/1983 | |
| JP | 58131781 A | 10/1983 | |
| JP | 60213069 A | 10/1985 | |
| JP | 60213069 A | 3/1986 | |
| JP | 61230110 A | 10/1986 | |
| JP | 61230110 A | 2/1987 | |
| JP | 05113525 A | 5/1993 | |
| JP | 05113525 A | 8/1993 | |
| JP | 05307175 A | 11/1993 | |
| JP | 11261111 A | 9/1999 | |
| JP | 11261111 A | 12/1999 | |
| JP | 2000294831 A | 10/2000 | |
| JP | 2003086845 A | 3/2003 | |
| WO | 0029785 A1 | 5/2000 | |
| WO | WO0029785 A | 5/2000 | |

* cited by examiner

HIGH BRIGHTNESS ILLUMINATION DEVICE WITH INCOHERENT SOLID STATE LIGHT SOURCE

CROSS REFERENCE TO RELATED CASES

Applicant(s) claim(s) the benefit of Provisional Application Ser. No. 60/553,749, filed Mar. 16, 2004.

This invention pertains to the field of light sources for display devices, and in particular, illumination devices based on incoherent solid state light sources.

Illumination devices based on solid state devices, such as light emitting diodes (LEDs), have many desirable characteristics. Accordingly, it has been desired to adapt such illumination devices for use in projection displays based on a microdisplay device, such as a liquid crystal on silicon (LCOS) imaging device. For example, in comparison to existing projection display light sources such as ultra high pressure (UHP) arc lamps, etc., LED-based illumination devices have a superior lifetime, produce a more pure color with little or no undesired ultraviolet or infrared light, and operate with DC power at reasonable voltage levels. Also, LED-based illumination devices can be intensity-modulated, which makes them well-suited for frame sequential color illumination schemes. Additionally, the use of separate color LED light sources enables compact color management architectures to be created.

However, a critical requirement for an illumination system for a projection display system is a high brightness level. Unfortunately, the brightness levels of existing LED-based illumination devices are substantially less than the brightness levels of conventional UHP arc lamps. Therefore, for example, when existing LED-based illumination devices are used in projection display systems, the screen size that can be illuminated and still provide an acceptably bright image is limited. Although efforts are continually undertaken to improve things such as the base materials used for fabricating LED light sources, heat sinking of LED light sources, etc., thus far these efforts have produced limited results.

Accordingly, it would be desirable to provide an illumination device using an incoherent solid state light source, which has a high brightness level. It would further be desirable to provide an improved illumination device suitable for use in projection display systems. The present invention is directed to addressing one or more of the preceding concerns.

In one aspect of the invention, an illumination device comprises an incoherent solid state light source adapted to emit light over at least one light emission surface and having a total light emission surface area $S_0$; and a reflective cavity having an entrance aperture for receiving the light from the incoherent solid state light source and a light extraction aperture for outputting the light from the incoherent solid state light source, wherein a surface area $S_1$ of the light extraction aperture of the reflective cavity is smaller than $S_0$.

In another aspect of the invention, an illumination device comprises an incoherent solid state light source adapted to emit light over at least one light emission surface, and having a total light emission surface area $S_0$; and a reflective layer disposed directly on and covering the incoherent solid state light source and having therein an opening for outputting the light from the incoherent solid state light source, wherein an area $S_1$ of the opening of the reflective layer is smaller than $S_0$.

In another aspect of the invention, an illumination device comprises an incoherent solid state light source adapted to emit light over a at least one light emission surface, and having a total light emission surface area $S_0$; a light circulation device including at least one light receiving surface adapted to receive the light from the incoherent solid state light source, and a light extraction area having a second surface area $S_1$; and means for extracting the light from the light circulation device at the light extraction area, wherein $S_1$ is smaller than $S_0$.

As used herein, the term "incoherent solid state light source" refers to an arrangement of one or more incoherent solid state devices (e.g., light emitting diodes; organic light emitting diodes; etc.) emitting light, such as a large surface area LED chip, an LED array, or one or more extended linear LEDs.

Figure 1:
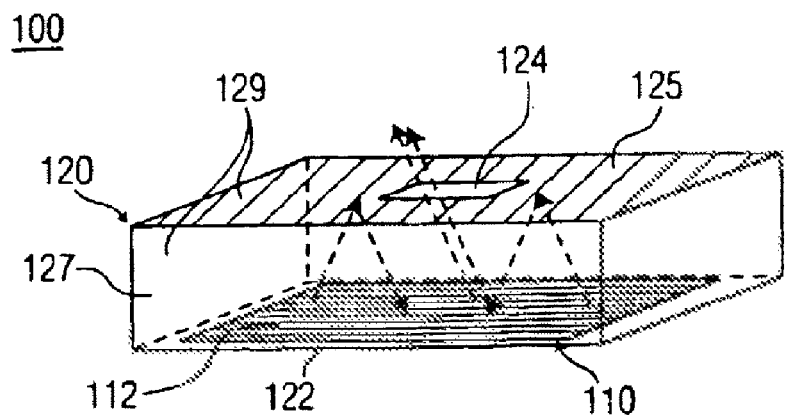
FIG. 1 shows a first embodiment of an illumination device according to one or more aspects of the present invention.

FIG. 1 shows a first embodiment 100 of an illumination device.

The illumination device 100 of FIG. 1 includes an incoherent solid state light source 110 and a reflective cavity 120 having an entrance aperture 122 and a light extraction aperture 124.

The incoherent solid state light source 110 may comprise a single extended or large surface area light emitting diode (LED) chip, or an array of smaller LEDs. The incoherent solid state light source 110 emits light over a light emission surface 112 having a total light emission surface area $S_0$. As a solid state device, incoherent solid state light source 110 may be easily electronically controlled (e.g., switched on and off, intensity modulated, etc.) as desired to control the light output of the illumination device 100.

Meanwhile, the reflective cavity 120 is a light circulation device. The inside of the top surface 125 and the sidewalls 127 of the reflective cavity 120 are highly reflective at the wavelengths of the light emitted by the incoherent solid state light source 110. For example, the inside surfaces of the reflective cavity 120 may be coated with a highly reflective mirror coating 129. This may be a metallic coating, a dielectric multilayer coating, or even achieved by total internal reflection. Alternatively, the material used to form the structure of the reflective cavity 120 may itself be a highly reflective material. Furthermore, the reflective cavity 120 is disposed such that the entrance aperture 122 covers the light emission surface 112 of the incoherent solid state light source 110.

Significantly, the surface area $S_1$ of the light extraction aperture 124 of the reflective cavity 120 is substantially smaller than the surface area $S_0$ of the light emission surface 112 of the incoherent solid state light source 110.

The illumination device 100 operates as follows. Light emitted by the incoherent solid state light source 110 at the light emission surface 112 enters the reflective cavity 120 through the entrance aperture 122. Some of the light will initially impinge on the light extraction aperture 124 of the reflective cavity 120 and thereby exit the reflective cavity 120. The remainder of the light emitted by the incoherent solid state light source 110 will be confined within the cavity by the reflective inside surfaces. The light will bounce around within the reflective cavity 120 until it finally impinges on the light extraction aperture 124 of the reflective cavity 120 and thereby exits the reflective cavity 120. Hence, light exiting through the light extraction aperture 124 of the reflective cavity 120 includes contributions from the light from the normal emitting area of the incoherent solid state light source 110 that directly impinges on the light extraction aperture 124, and contributions from the rest of the light emission surface 112 of the incoherent solid state light source 110. Accordingly, the apparent brightness of the light has been increased by distributing it over a smaller area.

Alternatively, the highly reflective mirror coating 129 can be provided directly on the light emission surface 112 of the incoherent solid state light source 110 without any cavity structure. The highly reflective mirror coating 129 is provided with an opening for the light extraction aperture 124, located above a small area of the light emission surface 112 of the incoherent solid state light source 110. Beneficially, an index matching material such as a fluid or gel is provided on the small area of the light emission surface 112 which is not covered by the highly reflective mirror coating 129. Also, LED materials are normally highly refractive and support total internal reflection at high angles, especially with an air cladding. Accordingly, in another alternative arrangement, the incoherent solid state light source 110 comprises a large surface area LED chip whose light emitting surface 112 is clad with air, except in a small area of the light emitting surface 112 where an index matching material such as a fluid or gel is provided.

Beneficially, the shape of the light extraction aperture 124 can be arbitrarily chosen to match a desired shape of a light beam to be produced by the illumination device 100. For example, when the illumination device 100 is to be used to illuminate a rectangular micro-display device (e.g., and LCOS imaging device) for a widescreen projection display system, then the aspect ratio of the light extraction aperture 124 can be set to 16:9.

Figure 2:
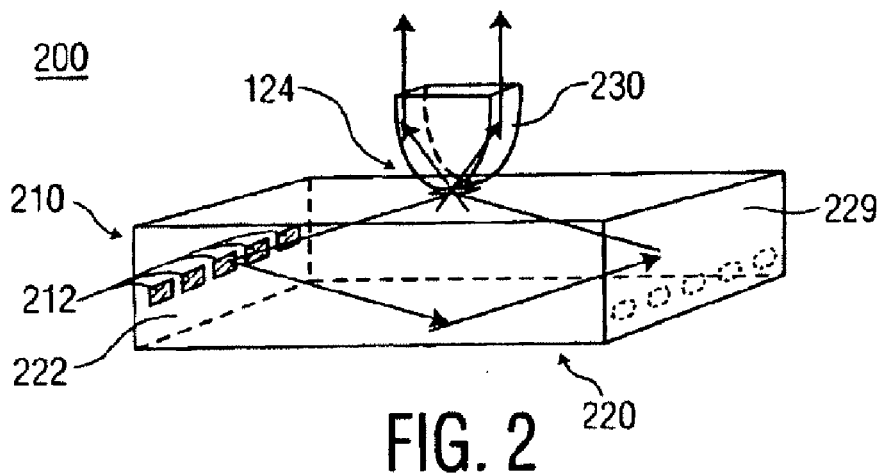
FIG. 2 shows a second embodiment of an illumination device according to one or more aspects of the present invention.

FIG. 2 shows a second embodiment 200 of an illumination device.

The illumination device 200 of FIG. 2 includes an incoherent solid state light source 210, a light guide 220, and a light extraction device 230.

The incoherent solid state light source 210 is arranged with a light emission surface 212 disposed adjacent to a light receiving surface 222 of the light guide 220 which is adapted to receive the light from the incoherent solid state light source 210. The light extraction device 230 is arranged to be optically coupled to the light guide 220 via a light extraction area 224 of the light guide 220 having an extraction surface area $S_1$.

The incoherent solid state light source 210 may comprises a large number of individual LEDs configured in one or more arrays, or a fewer number of large surface area or extended linear LEDs. Beneficially, the LED-based illumination device 200 the incoherent solid state light source 210 may be physically separated into two or more large surface area LEDs or LED arrays each having a different light emission surface 212 disposed adjacent to a corresponding light receiving surface 222 of the light guide 220. The light emission surface(s) 212 of the incoherent solid state light source 210 has a total light emission surface area $S_0$.

Beneficially, the incoherent solid state light source 210 provides collimated light to the light guide 220.

The light guide 220 is a light circulation device. Beneficially, the light guide 220 is fabricated of a low-loss, solid, transparent material with a refractive index N>1. Optionally, the light guide 220 may be hollow. On exterior surfaces of the light guide 220 where total internal reflection (TIR) is not supported, a highly reflective material 229 is provided. The highly reflective material 229 may be Spectralon, Teflon, or another suitable material.

Beneficially, the light extraction device 230 is a light-collimating structure such as a compound parabolic collimator (CPC), or a prismatic optical component that extracts the light from the light guide 220. Beneficially, light extraction device 230 is fabricated of a material which is refractive index-matched to the solid transparent material of the light guide 220.

Significantly, the surface area $S_1$ of the light extraction area 224 of the light guide 220 is substantially smaller than the total surface area $S_0$ of the light emission surface(s) 212 of the incoherent solid state light source(s) 210.

The illumination device 200 operates as follows. Light emitted by the incoherent solid state light source 210, at the light emission surface(s) 212, enters the light guide 220 at one or more corresponding light receiving surface(s) 222. Some of the light will initially be coupled out of the light guide 220 through the light extraction area 224 and emerge as a collimated light beam at the light extraction device 230. The remainder of the light emitted by the incoherent solid state light source 210 will be confined within the light guide 220 by TIR and by the highly reflective material 229 provided on surfaces of the light guide 220 that do not support TIR. The light will bounce around within the light guide 220 until it is finally coupled out of the light guide 220 through the light extraction area 224 and emerges as a collimated light beam at the light extraction device 230. Hence, light exiting through light extraction device 230 includes contributions from the light from the total area of the light emission surface(s) 212 of the incoherent solid state light source 210. Accordingly, the apparent brightness of the light has been increased by collimating and distributing it over a smaller area.

In similarity to the embodiment of FIG. 1, the light extraction aperture 224 can be arbitrarily chosen to match a desired shape of a light beam to be produced by the illumination device 200. For example, when the illumination device 200 is to be used to illuminate a rectangular micro-display device (e.g., and LCOS imaging device) for a widescreen projection display system, then the aspect ratio of the light extraction aperture 224 can be set to 16:9.

Figure 3:
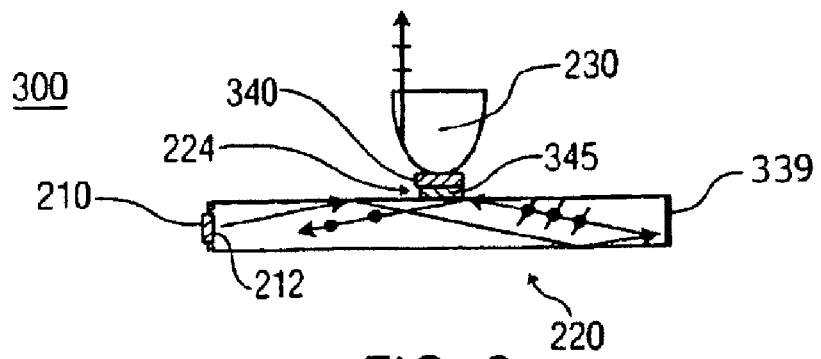
FIG. 3 shows a third embodiment of an illumination device according to one or more aspects of the present invention.

In some applications, such as when an illumination device is to be used to illuminate a rectangular micro-display device (e.g., and LCOS imaging device) for a widescreen projection display system, it is desired or necessary to produce a polarized (i.e., linearly polarized) light beam. FIG. 3 shows a third embodiment 300 of an illumination device that can produce and output a polarized light beam. The illumination device 300 is similar to the illumination device 200, except for the following differences. First, in place of the highly reflective material 229, diffusing reflectors 339 are provided on exterior surfaces of the light guide 220 where total internal reflection (TIR) is not supported. Second, a reflective polarizer 40 is provided between 25 the light guide 220 and the light extraction device 230. The reflective polarizer 340 may comprise a wire grid polarizer, a cholesteric polarizer, or a highly anisotropic layer of material that reflects light having one polarization (e.g., through TIR), and transits light having the orthogonal polarization.

As before, the light guide 220 is a light circulation device, and the surface area $S_1$ of the light extraction area 224 of the light guide 220 is substantially smaller than the total surface area $S_0$ of the light emission surface(s) 212 of the incoherent solid state light source 210.

The illumination device 300 also operates similarly to the illumination device 200, except with the following differences.

The light from the incoherent solid state light source 210 is assumed to be initially unpolarized. Light that reaches the light extraction area 224 of the light guide 220 is passed to the reflective polarizer 340. A part of the light that has the desired polarization passes through the reflective polarizer 340 and is coupled into the light extraction device 230 as a collimated, polarized light beam. The remainder of the light that does not have the desired polarization is reflected by the reflective polarizer 340 back into light guide 220. Meanwhile, the diffusing reflectors 329 operate to change the polarization of the light reflected back into the light guide 220 so that it has components having the correct polarization for passing through the reflective polarizer 340. So, in the illumination device 300 the light from the incoherent solid state light source circulates within the low-loss light guide 220 until it reaches the light extraction area 224 with the correct polarization to pass through the reflective polarizer 340 and into the light extraction device 230.

Accordingly, the apparent brightness of the light has been increased by collimating and distributing it over a smaller area, and the light has been correctly polarized as desired without discarding the portion of the light that was originally of the wrong polarization.

In an alternative arrangement, the diffusing reflector(s) 329 are replaced with specular reflector(s) 329 disposed on exterior surfaces of the light guide 220 where total internal reflection (TIR) is not supported, and a quarter wavelength foil 345 is provided in an optical path between each specular reflector 329 and the reflective polarizer. Here, the axis of the quarter wavelength foil makes an angle of about 45 degrees with the transmission direction of the reflective polarizer 340. The quarter wavelength foil 345 may be provided between the light guide 220 and the reflective polarizer 340, or between each specular reflector 329 and the corresponding sidewall of the light guide 220.

Figure 4:
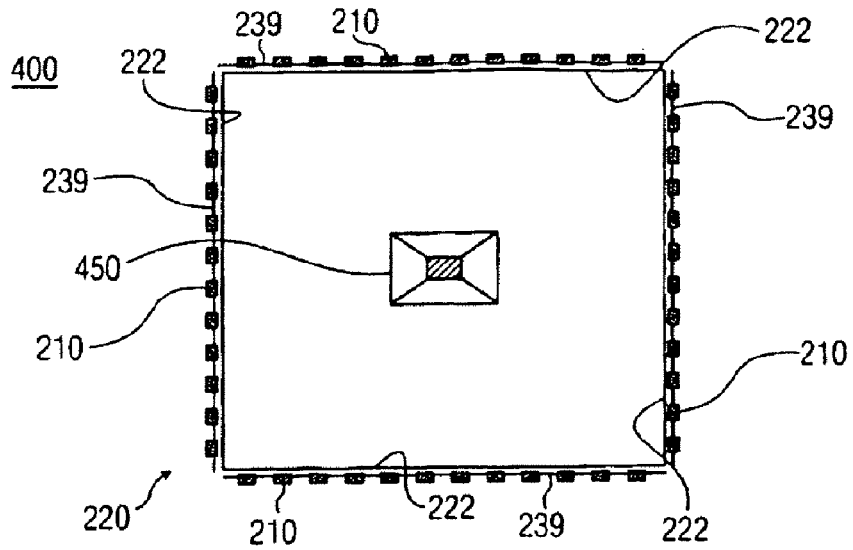
FIG. 4 shows a fourth embodiment of an illumination device according to one or more aspects of the present invention.

FIG. 4 shows a top view of a fourth embodiment 400 of an illumination device that can produce and output a polarized light beam.

The illumination device 400 is similar to the illumination device 200, with a large area LED chip, or LED array, disposed along each of the four sidewalls of the light guide 220. The highly reflective material 239 covers any areas of the sidewalls where the LED(s) are not arranged. In contrast to the illumination device 200, in the illumination device 400 the light guide 220 is provided on one surface with a light extraction device 450 comprising light extraction and collimation optics.

The operation of the illumination device 400 is the same as that of the illumination device 200.

FIG. 4 illustrates that the achievable ultimate brightness of such an illumination device can be extremely high if a sufficiently large light guide is employed, and if an LED or LED array having a sufficiently large light emission surface area is coupled to the light guide. The final light output brightness is proportional to the ratio of the total surface area $S_0$ of the light emission surface of the incoherent solid state light source, to the surface area $S_1$ of the extraction area of the light guide where the light extraction device is coupled. Additionally, the fraction of light that is out-coupled from the incoherent solid state light source (i.e., the coupling efficiency) also determines the integrated output brightness and should be maximized.

Figure 5:
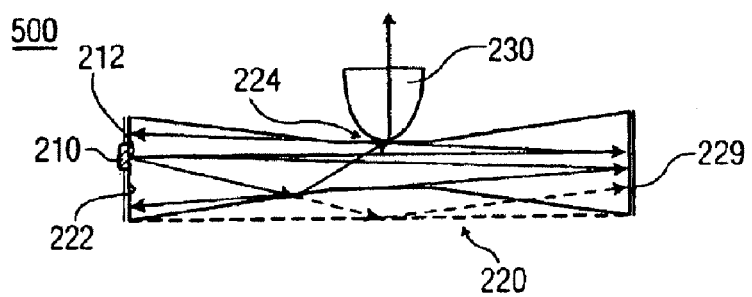
FIG. 5 shows a fifth embodiment of an illumination device according to one or more aspects of the present invention.

FIG. 5 shows a fifth embodiment 500 of an illumination device.

The illumination device 500 is similar to the illumination device 200, except for the following differences.

In the illumination device 500, the cross-section of the light guide 220 in planes parallel to the light receiving surface(s) 222 (sidewalls) to which the incoherent solid state light source 210 is coupled, varies in size. That is, the cross-section of the light guide 220 is "thicker" in some areas than in others. Specifically, the cross-section of a portion of the light guide 220 close to the light extraction area 224 is smaller than in other areas of the light guide 220. The reduced cross-section near the light extraction area 224 increases the chances of single-path light extraction, and minimizes the reflection loss for the retro-reflected light rays. Therefore the light-coupling efficiency of the light guide 220 is increased.

Figure 6:
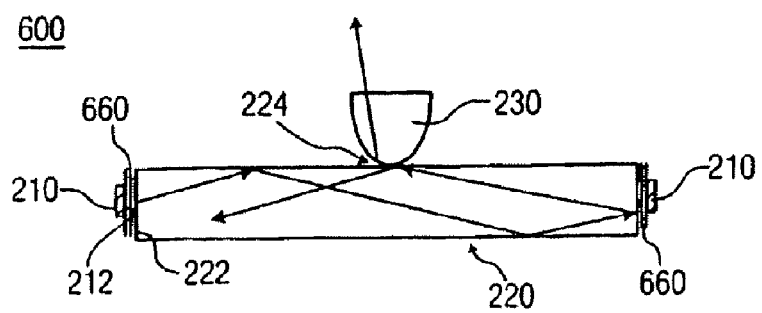
FIG. 6 shows a sixth embodiment of an illumination device according to one or more aspects of the present invention.

In some applications, such as when an illumination device is to be used to illuminate a rectangular micro-display device (e.g., and LCOS imaging device) for a projection display system, it is desired or necessary to produce a light beam that can have different colors. FIG. 6 shows a sixth embodiment 600 of an illumination device that can output light having different colors.

The illumination device 600 includes two different incoherent solid state light sources 210 emitting light having two different spectral colors (e.g., red and blue). However, it is understood that more than two incoherent solid state light sources 210 could be employed having more than two colors, and colors other than red and blue are of course possible.

In addition to the components previously described above with respect to FIG. 2, the illumination device 600 includes two dichroic filters 660, each disposed between the light emission surface 212 of a corresponding incoherent solid state light source 210, and the corresponding light receiving surface 222 of the light guide 220. Each dichroic filter 660 transits light having a first color corresponding to the color of the light emitted from the adjacent incoherent solid state light source 210, and reflects light having the other wavelengths of the light produced by the other incoherent solid state light sources 210 coupled into the light guide 220. Each incoherent solid state light source 210 may be individually electronically controlled (e.g., switched on and off, intensity modulated, etc.) to provide full color control of the collimated light beam at the light extraction device 230.

While embodiments are disclosed herein, many variations are possible which remain within the concept and scope of the invention. For example Such variations would become clear to one of ordinary skill in the art after inspection of the specification, drawings and claims herein. The invention therefore is not to be restricted except within the spirit and scope of the appended claims.

The invention claimed is:

1. An illumination device, comprising:
    an incoherent solid state light source adapted to emit light over at least one light emission surface and having a total light emission surface area $S_0$,
    a solid light guide having an entrance aperture adapted to receive the light from the incoherent solid state light source and a first surface that is configured to reflect the light within the solid light guide by total internal reflection, and
    a light extraction device adapted to extract the light from the solid light guide and output the light from the incoherent solid state light source,
    wherein:
    the light extraction device has a refractive index that substantially matches a refractive index of the solid light guide, and includes:

a first surface area $S_1$ that is in optical contact with the solid light guide and extracts the light by preventing the total internal reflection at the surface area $S_1$, and a second surface area $S_2$ that outputs the light; and the first surface area $S_1$ is substantially smaller than the surface areas $S_0$ and $S_2$, and the second surface area $S_2$ is substantially smaller than the surface area $S_0$, such that an apparent brightness of the light output at the second surface area $S_2$ is substantially larger than an apparent brightness of the light source.

2. The illumination device of claim 1, wherein the incoherent solid state light source includes a single extended LED having a length that is substantially larger than its width.

3. The illumination device of claim 1, wherein the incoherent solid state light source includes an array of LEDs.

4. The illumination device of claim 1, wherein the surface $S_1$ has a rectangular shape and an aspect ratio of 16:9.

5. The illumination device of claim 1, wherein the surface $S_2$ has a rectangular shape and an aspect ratio of 16:9.

6. The illumination device of claim 1, including:
a reflective polarizer disposed in an optical path between the solid light guide and the light extraction device; and
a polarization changing reflector on at least one surface of the solid light guide.

7. The illumination device of claim 6, wherein the polarization changing reflector includes a quarter wavelength foil.

8. The illumination device of claim 1, including:
a reflective polarizer disposed in an optical path between the solid light guide and the light extraction device,
a reflector arranged on at least one surface of the solid light guide, and
a quarter wavelength foil in an optical path between the reflector and the reflective polarizer.

9. The illumination device of claim 1, wherein the light extraction device is a compound parabolic collimator.

10. The method of claim 9, including providing a reflective polarizer between the second and third surface areas.

11. The method of claim 10, including providing a quarter wave foil between the second area and the reflective polarizer.

12. An illumination device comprising:
an incoherent solid state light source adapted to emit light over at least one light emission surface and having a total light emission surface area $S_o$,
a light circulation device including a solid light guide that includes at least one light receiving surface adapted to receive the light from the incoherent solid state light source, and at least one light reflecting surface adapted to reflect the light by total internal reflection, and
light extraction means for extracting the light from the reflecting surface of the light circulation device to provide an entirety of light output of the illumination device,
wherein:
the light extraction means includes:
a light extraction surface of area $S_1$ in contact with the reflecting surface, and has a refractive index that substantially matches a refractive index of the light circulation device thereby extracting the light by preventing the total internal reflection at the light extraction surface, and
a light output surface of area $S_2$ that provides the total light output,
area $S_1$ is smaller than areas $S_0$ and $S_2$, and
area $S_2$ is substantially smaller than area $S_0$, so that an apparent brightness of the light output surface is substantially greater than an apparent brightness of the light emission surface.

13. The illumination device of claim 12, wherein the light circulation device includes a reflective material disposed on a surface of the light guide that does not support total internal reflection.

14. The illumination device of claim 12, wherein the light extraction means includes a light collimating structure.

15. The illumination device of claim 12, wherein the light extraction means includes a compound parabolic collimator.

16. The illumination device of claim 12, wherein the light extraction means includes a prismatic optical component.

17. The illumination device of claim 12, including a reflective polarizer disposed in an optical path between the light extraction area and the light extraction means, wherein the light circulation device includes at least one diffusing reflector disposed at a sidewall thereof.

18. The illumination device of claim 12, wherein the light circulation device includes at least one specular reflector disposed at a sidewall thereof, said illumination device further comprising:
a reflective polarizer disposed in an optical path between the light extraction area and the light extraction means; and
a quarter wavelength foil in an optical path between the specular reflector and the reflective polarizer.

19. The illumination device of claim 12, wherein the light circulation device includes at least two light receiving surfaces and the incoherent solid state light source includes at least two light-emitting components, each light-emitting component being disposed adjacent to and confronting a corresponding one of the light receiving surfaces.

20. The illumination device of claim 12, wherein the light circulation device has a cross-section thickness perpendicular to the light extraction area that is less near the light extraction area than at the light receiving surface.

21. The illumination device of claim 12, including:
a second incoherent solid state light source adapted to emit light over at least a second light emission surface,
wherein the light circulation device includes at least a second light receiving surface adapted to receive the light from the second incoherent solid state light source, and
wherein the two incoherent solid state light sources each emit light having a different spectral color.

22. The illumination device of claim 12, wherein the incoherent solid state light source includes a single extended LED having a length that is substantially larger than its width.

23. A method of manufacturing an illumination device, comprising:
providing a solid light guide that circulates, the light guide including a first surface area for receiving light from a light source, and at least a second surface area that provides total internal reflection to the light from the light source,
providing a light extraction device that has an index of refraction that substantially matches an index of refraction of the solid light guide, the light extraction device including:
a third surface area for extracting light from the solid light guide, the third surface area being substantially smaller than the first surface area, and
a fourth surface area for outputting light from the light extraction device, the fourth surface area being larger than the third surface area, optically coupling the light extraction device to the light guide by coupling the third surface area to the second surface area, eliminating the total internal reflection at the coupled area.

24. The method of claim 23, including providing the light source and optically coupling the light source to the first surface area.

25. The method of claim 23, including providing a polarization changing reflector on another surface of the solid light guide that does not provide total internal reflection.

26. The method of claim 23, wherein the third surface area is smaller than the fourth surface area and the light extraction device includes a compound parabolic collimator.

27. The method of claim 26, wherein the fourth surface area is rectangular and has an aspect ratio that substantially equals 16:9.

* * * * *